(12) United States Patent
Kikuchi et al.

(10) Patent No.: US 7,474,027 B2
(45) Date of Patent: Jan. 6, 2009

(54) PERMANENT MAGNET MOTOR

(75) Inventors: Tomohiro Kikuchi, Tokyo (JP); Takashi Miyazaki, Tokyo (JP); Haruyuki Kometani, Tokyo (JP); Shinichi Yamaguchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 520 days.

(21) Appl. No.: 10/542,375

(22) PCT Filed: Jan. 15, 2003

(86) PCT No.: PCT/JP03/00266

§ 371 (c)(1),
(2), (4) Date: Feb. 14, 2006

(87) PCT Pub. No.: WO2004/064225

PCT Pub. Date: Jul. 29, 2004

(65) Prior Publication Data

US 2006/0131976 A1   Jun. 22, 2006

(51) Int. Cl.
*H02K 1/27* (2006.01)
(52) U.S. Cl. .............................. 310/156.53; 310/156.46
(58) Field of Classification Search ............ 310/156.53, 310/156.46, 156.45, 156.38
See application file for complete search history.

(56) References Cited

U.S. PATENT DOCUMENTS

| 4,933,583 A * | 6/1990 | Ripplinger ............. 310/156.22 |
| 6,390,907 B1 * | 5/2002 | Metzler et al. ............. 451/360 |
| 2006/0226713 A1 * | 10/2006 | Lehr et al. .................... 310/12 |

FOREIGN PATENT DOCUMENTS

| JP | 2000-350393 A | 12/2000 |
| JP | 2002-34185 A | 1/2002 |
| JP | 2002-165428 A | 6/2002 |

* cited by examiner

*Primary Examiner*—Gary F. Paumen
(74) *Attorney, Agent, or Firm*—Sughrue Mion, PLLC

(57) ABSTRACT

A permanent magnet motor 1 includes a rotor in which permanent magnets 31 are fixed. In the rotor 20, the outer peripheral shape of rotor magnetic-pole portions 24 is formed so that, in the circumferentially central portion, the distance from the center of the rotor iron core 21 is longest, and, at the inter-polar space, the distance from the center of the rotor iron core is shortest, and so that the outermost surface of the rotor magnetic-pole portions 24 forms an arc, and given that sheath thickness tc formed by the outer-side surface of each permanent magnet 31 and the outermost surface of each rotor magnetic-pole portion 24 is practically constant, and letting the thickness of the permanent magnets be the magnet thickness tm, then the relation tc/tm≦0.25 is satisfied.

5 Claims, 4 Drawing Sheets

| FEATURES | EMBODIMENT1 | CONVENTIONAL ART |
|---|---|---|
| ROTOR SHEATH THICKNESS tc(mm) | 0.5 | 5(MAX) |
| MAGNET THICKNESS tm(mm) | 3 | 3 |
| MAGNET THICKNESS RATIO tc/tm | 0.167 | |
| ROTOR ARC RADIUS Rp(mm) | 29.1 | 29.1 |
| ROTOR MAXIMUM DIAMETER Dr(mm) | 107 | 107 |
| ROTOR DIAMETER RATIO Rp/Dr | 0.272 | 0.272 |
| COGGING TORQUE RELATIVE VALUE | 1.0 | 3.267 |
| TORQUE LINEARITY RELATIVE VALUE | 1.059 | 0.6497 |

PERMANENT MAGNET MOTOR

TECHNICAL FIELD

The present invention relates to remedying cogging torque and improving torque linearity characteristics in permanent magnet motors having permanent magnets.

BACKGROUND ART

A conventional permanent magnet motor will be described referring to Japanese Laid-Open Patent Publication 119175/1987. The permanent magnet motor (henceforth referred to as "surface magnet motor") such as this has a rotor provided with a plurality of permanent magnets fixed to the periphery of a rotary shaft, spacers between the permanent magnets, and pressing members formed of non-magnetic material for pressing radially on the surface of the permanent magnets.

In terms of this surface magnet motor, since the magnets are fixed to the surface of the rotor, the surface magnet motor has excellent torque linearity characteristics in terms of linearity between torque and current. Thus, under high load, large torque can be obtained with small current, providing excellent controllability.

However, the foregoing surface magnet motor requires the pressing members and associated components for fixing the permanent magnets, resulting in a complicated structure.

In order to solve the above mentioned problems, Japanese Laid-Open Patent Publication 197292/2000 discloses an interior permanent magnet motor.

In terms of the technology disclosed in the patent publication, the interior permanent magnet motor has rectangular, axially penetrating slots for the magnets, provided circumferentially in a rotor iron core at equal intervals in an amount for the number of poles of the rotor, with the long side of the slots oriented circumferentially along the iron core and the short sides oriented radially along the iron core, a permanent magnet being fixed in each of the magnet slots so that, with the magnetic-pole faces diametrically oriented in the iron core, neighboring magnetic poles are opposites, wherein the outer peripheral shape of the magnetic-pole portions of the rotor, formed along the magnetic-pole faces on the outer peripheral side of each of the permanent magnets, is such that each of the rotor magnetic-pole portions is arcuate so that, in the circumferentially central portion the distance from the iron core center is longest, and in the portions between poles the distance from the iron core center is shortest.

In terms of the interior permanent magnet motor, the permanent magnets are embedded in the rotor iron core, so that the pressing members for fixing the permanent magnets are unnecessary.

However, in the interior permanent magnet in the above described Japanese Laid-Open Patent Publication 197292/2000, the thickness of the outer portion of the rotor iron core is not prescribed, so that a problem has been that the cogging torque—the torque variation that when no current is flowing occurs due to harmonic components of the air-gap magnetic flux density—becomes somewhat large, and the torque linearity cannot be improved.

The present invention is intended to solve the above described problems and has as an object the provision of a permanent magnet motor in which the cogging torque is lowered and the torque linearity is improved.

DISCLOSURE OF THE INVENTION

In a first aspect of the invention, a permanent magnet motor includes: a stator having a stator coil; and a rotor, having a plurality of axially bored magnet slots, provided in an amount for the number of poles in the rotor iron core, permanent magnets being fixed into the magnet slots so that neighboring magnetic poles are opposites; wherein in the rotor, the outer peripheral shape of rotor magnetic-pole portions, formed along each magnetic-pole face on the outer peripheral side of the permanent magnets, is formed so that, in a circumferentially central portion thereof, the distance from the center of the rotor iron core is longest, and, at the inter-polar space between a first of the permanent magnets and a second of the permanent magnets, the distance from the center of the rotor iron core is shortest, and so that the outermost surface of rotor magnetic-pole portions forms an arc, each magnet slot, whose radially outer side approximately matches the arc, being bored in an approximate bow shape; and given that sheath thickness tc formed by the outer-side surface of each permanent magnet and the outermost surface of each rotor magnetic-pole portion is approximately constant, and letting the thickness of each permanent magnet be the magnet thickness tm, then the relation tc/tm≦0.25 is satisfied.

According to the permanent magnet motor in this case, in comparison to conventional interior permanent magnet motors, an effect is realized in that the cogging torque is small and the torque linearity is improved.

In a second aspect of the invention, the permanent magnet motor satisfies the relation 0.143≦tc/tm≦0.174.

According to the permanent magnet motor in this case, the effect is realized of reducing the cogging torque even further.

In a third aspect of the invention, given that the diameter where the outer-side surface of the rotor is furthest from the center of the rotor iron core is the rotor maximum diameter Dr, and the radius of each arc formed by the outer-side surface of each of the rotor magnetic-pole portions is the rotor arc radius Rp, then the permanent magnet motor satisfies the relation 0.23≦Rp/Dr≦0.32.

According to the permanent magnet motor, in the rotor in this case, the magnetic flux wave form, from the N (S) pole of the permanent magnet to the S (N) pole, approximates an ideal sinusoidal wave, so that the effect of reducing the cogging torque is obtained.

In a fourth aspect of the invention, given that the width of each of the magnet slots, corresponding to the thickness of each of the permanent magnets, is the slot width th, and with both ends of each of the magnet slots being provided with an approximately semi-circular surface, the radius of the semi-circular surface is the slot-end radius Rh, then the permanent magnet motor satisfies the relation 0.45≦Rh/th≦0.5.

According to the permanent magnet motor in this case, the stress concentration in the corner portions of the magnet slots provided in the rotor is eased, so that the effect of enabling high speed rotation of the rotor is obtained.

In a fifth aspect of the invention, the permanent magnet motor is such that the number of poles in the rotor is 2n, and the number of salient poles in the stator is 3n, where n is a positive integer larger than zero.

According to the permanent magnet motor in this case, where, for example, the rotor is skewed, the effect of further reducing the cogging torque is obtained.

BEST MODE FOR CARRYING OUT THE INVENTION

EMBODIMENT 1

Figure 1:
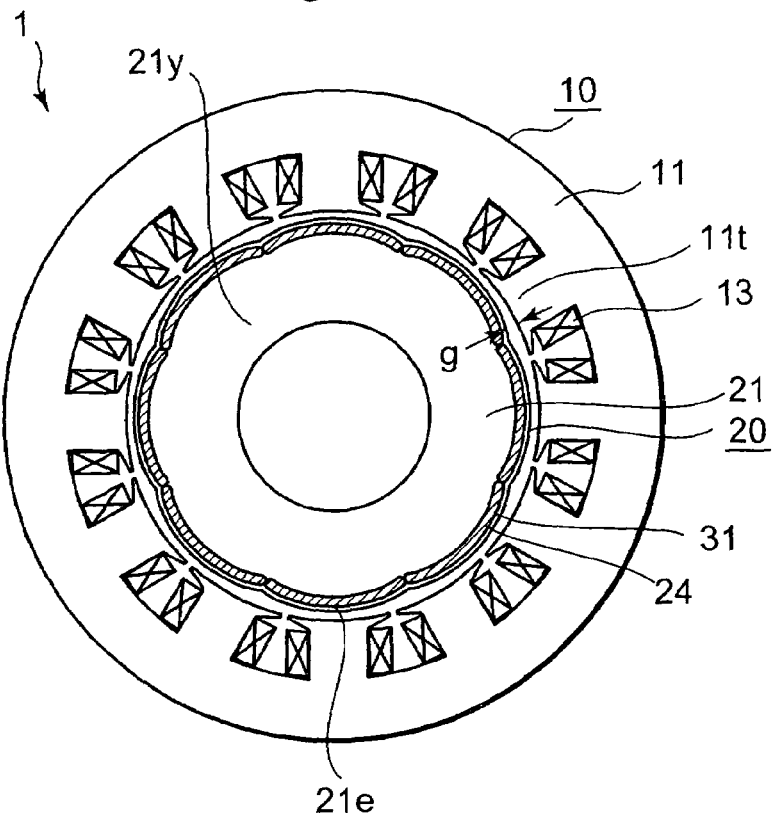
FIG. 1 is a cross-sectional diagram of a permanent magnet motor according to an embodiment of the present invention.

An embodiment of the present invention will be described using FIG. 1 through FIG. 3. FIG. 1 is a cross-sectional diagram of a permanent magnet motor according to the embodiment of the present invention, FIG. 2 is a cross-sectional diagram of a rotor in the permanent magnet motor illustrated in FIG. 1, and FIG. 3 is an enlarged partial cross-sectional diagram illustrating magnetic flux flow from the rotor to a stator in the permanent magnet motor illustrated in FIG. 1.

Figure 2:
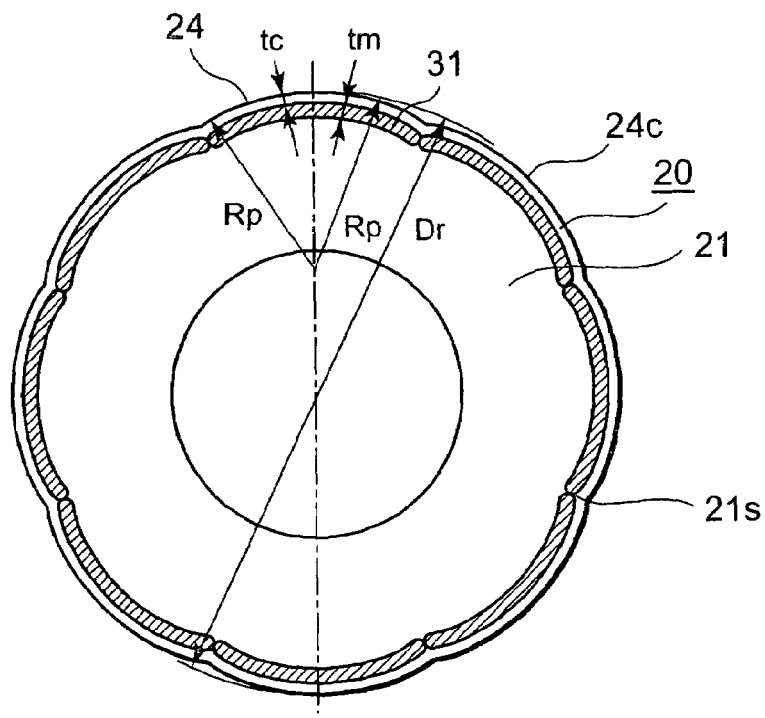
FIG. 2 is a cross-sectional diagram of a rotor in the permanent magnet motor illustrated in FIG. 1.
Figures 3, 4:
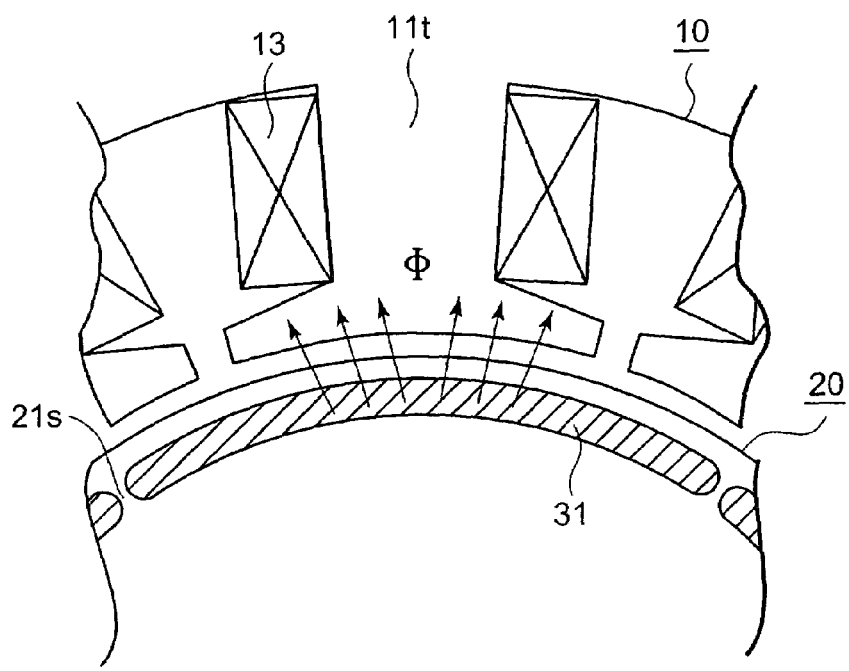
FIG. 3 is an enlarged partial cross-sectional diagram illustrating magnetic flux flowing from the rotor to a stator in the permanent magnet motor illustrated in FIG. 1.
FIG. 4 is a table comparing numerical values and characteristics of various components of the permanent magnet motor illustrated in FIG. 1 with a conventional interior magnet motor.

In FIG. 1 and FIG. 2, the permanent magnet motor 1 includes: a stator 10 composed of a stator iron core 11 made by die-cutting thin electromagnetic steel sheets, and by laminating the electromagnetic steel sheets, and having stator coils 13 wound around twelve salient poles 11t; and an eight-pole rotor 20 having permanent magnets 31. The permanent magnet motor is configured so that the number of poles of the rotor 20 is 2n, and the number of salient poles 11t of the stator 10 is 3n, where n is a positive integer larger than 0, a gap g is formed between the stator 10 and the rotor 20, and when the stator coils 13 are energized, the rotor 20 is rotated by the revolving magnetic field.

The rotor 20 is a form of a chrysanthemum seal having the same number of petals as the magnetic poles, and is composed of a rotor iron core 21 that is made by die-cutting electromagnetic steel sheets having the thickness tr (not illustrated in the figure) of 0.35 (mm) into predetermined forms, to be laminated together. A hole 21y is axially bored in the center of the rotor iron core to the inside of the permanent magnets 31. Eight magnet slots 21e, whose cross-section surfaces are approximately arcuate, for engaging and fixing the permanent magnets 31, are axially bored. An inter-polar space 21a is formed between a first of the permanent magnets 31 and a second of the permanent magnets 31 that are adjacent to each other. The permanent magnets are disposed so that magnetic poles of the first of the permanent magnets 31 and the second of the permanent magnets 31 are opposites, and rotor magnetic-pole portions 24 are formed toward the stator 10 side of the permanent magnets 31, more specifically, outward of the permanent magnets 31.

The rotor magnetic-pole portions 24 are formed so that each rotor magnetic-pole portion 24 is arcuate, with the distance from the center of the rotor iron core 21 being largest in the circumferentially central portion of the outer-side face 24c (outer peripheral shape) of each rotor magnetic-pole portion 24, and the distance from the center of the rotor iron core 21 being shortest at the inter-polar space 21a between the permanent magnets 31, and are formed so that the sheath thickness tc, which is the distance between the outer-side face of the permanent magnets 31 and the outer-side face 24c of the rotor magnetic-pole portion 24, is approximately constant, and the sheath thickness tc is as thin as possible in consideration of die-cut manufacturing.

The cross section of each permanent magnet 31 is approximately arcuate, and the magnet thickness in the radial direction of the rotor 20 is tm.

According to the permanent magnet motor 1 configured as described above, the rotor magnetic-pole portions 24 of the rotor 20 are made of electromagnetic steel sheets, so that magnetic flux $\Phi$ from the permanent magnets 31 leaks through the rotor magnetic-pole portions 24 as illustrated in FIG. 3. However, the sheath thickness tc of the rotor magnetic-pole portions 24 in the rotor 20 is formed to be thin, so that the magnetic resistance across the rotor magnetic-pole portions 24 is extremely large, and the magnetic flux leakage from the permanent magnets 31 through the rotor magnetic-pole portions 24 is small. Consequently, because the magnetic flux from the rotor magnetic-pole portions 24 comes close to saturation, the magnetic flux generated from the revolving magnetic field of the stator 10 becomes hard to pass through the rotor magnetic-pole portions 24 in the rotor 20, so that the torque linearity can be enhanced.

The diameter of the rotor 20 varies as illustrated in FIG. 1 and FIG. 4 as a specific example, and the permanent magnet motor 1 is configured so that the maximum rotor diameter Dr equals 107 (mm) where the diameter of the outer-side face 24c of the rotor 20 is maximum, the rotor arc radius Rp equals 29.1 (mm), which is the radius of the circular arc formed by the outer-side face 24c of each rotor magnetic-pole portion 24, the rotor diameter ratio Rp/Dr equals 0.272, the constant thickness tc of the sheath covering the permanent magnets 31 in the outermost portion of the rotor magnetic-pole portions 24 equals 0.5 (mm), the magnet thickness tm in the radial direction of the permanent magnets 31 equals 3 (mm), and the magnet thickness ratio tc/tm equals 0.16. According to the above-described permanent magnet motor 1, the characteristics in which the cogging torque relative value is 1.0, and the torque linearity relative value is 1.059 are obtained.

In contrast, in a conventional interior permanent magnet motor, because the sheath thickness tc of the rotor magnetic-pole portions varies, given that the maximum sheath thickness tc equals 5 (mm), and the magnet thickness tm of the permanent magnets 31, the maximum rotor diameter Dr, the rotor circular arc radius Rp, and the rotor diameter ratio Rp/Dr are the same as in the permanent magnet motor 1, then the cogging torque relative value is 3.267, and the torque linearity relative value is 0.6497. Thus, the characteristics of the cogging torque and the torque linearity in the permanent magnet motor 1 are improved compared to the conventional interior permanent magnet motor.

<Torque Linearity>

Figure 5:
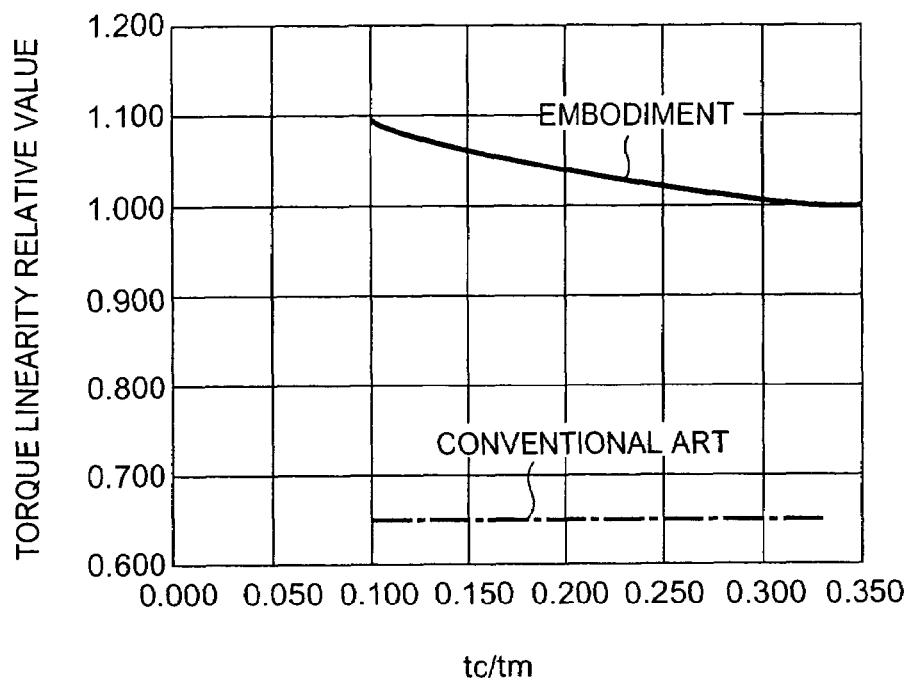
FIG. 5 is a characteristic diagram in which the relation between tc/tm and torque linearity is analyzed, where sheath thickness of the magnetic-pole portions of the rotor is tc, and magnet thickness of the permanent magnets is tm.

To begin with, the relationship between the sheath thickness tc of the rotor magnetic-pole portions 24 and the magnet thickness tm of the permanent magnets 31, and the torque linearity will be described according to FIG. 5. FIG. 5 is a characteristic diagram in which the relationship between the magnet thickness ratio tc/tm and the torque linearity is analyzed.

It is understandable that, as illustrated in FIG. 5, in order to enhance the torque linearity, the magnet thickness ratio tc/tm must be lowered. When the magnet thickness ratio tc/tm is lowered, the sheath thickness tc of the rotor magnetic-pole portions 24 gets relatively small compared to the magnet thickness tm, so that the magnetic flux of the rotor magnetic-pole portions 24 in the rotor 20 comes close to saturation. Consequently, the magnetic flux leakage flowing from the rotor 20 to the stator 10 decreases, so that the torque linearity can be enhanced.

<Cogging torque>

(1) Magnet thickness ratio tc/tm

Figure 6:
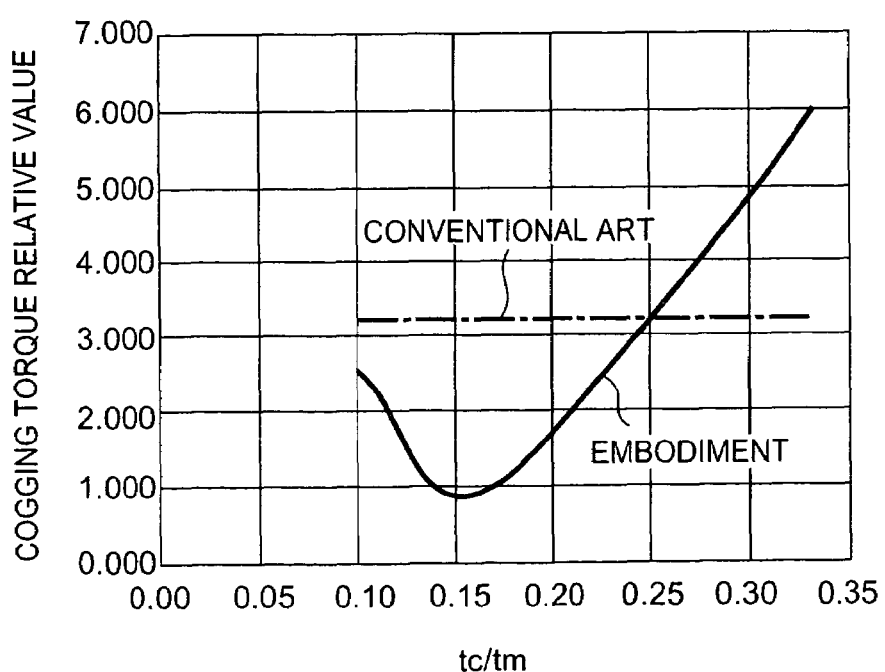
FIG. 6 is a characteristic diagram in which the relation between tc/tm and cogging torque is analyzed, where the sheath thickness of the magnetic-pole portions of the rotor is tc, and the magnet thickness of the permanent magnets is tm.

FIG. 6 is a characteristic diagram in which the relationship between the magnet thickness ratio tc/tm and cogging torque is analyzed, where the sheath thickness of the rotor magnetic pole portions is tc, and the magnet thickness of the permanent magnets is tm.

In FIG. 6, the cogging torque of the conventional interior permanent magnet motor is illustrated in alternate long and short dash line, and it is understandable that, in order to lower the cogging torque of the permanent magnet motor 1 than the cogging torque of the interior permanent magnet motor, the magnet thickness ratio tc/tm should be designated within a range tc/tm≦0.25.

The cogging torque relative value is minimum where the magnet thickness ratio tc/tm is around 0.158, because the magnetic flux in the rotor magnetic-pole portions 24 is saturated therearound. When the magnet thickness ratio tc/tm exceeds 0.158; the cogging torque relative value increases. This is because the larger the sheath thickness tc of the rotor magnetic-pole portions 24 relative to the magnet thickness tm of the permanent magnet 31, the larger the magnetic flux leakage from the permanent magnet 31 to the rotor magnetic-pole portions 24.

The cogging torque relative value increases where the magnet thickness ratio tc/tm is lower than 0.158. This is because, although the smaller the sheath thickness tc relative to the magnet thickness tm, the less the magnetic flux leakage from the permanent magnets 31 to the rotor magnetic-pole portions 24, magnetic flux passing from the permanent magnets 31 through the stator iron core 11 increases, so that the cogging torque relative value increases.

As described above, the cogging torque of the permanent magnet motor 1 is minimum where the magnet thickness ratio tc/tm is around 0.158, and the cogging torque increases as the magnet thickness ratio tc/tm exceeds 0.158, and increases as the magnet thickness ratio tc/tm gets smaller than 0.158.

If the permanent magnet motor 1 is manufactured so that the magnet thickness ratio tc/tm equals 0.158, dimensional deviations arise in the magnet thickness tm and the sheath thickness tc. If the dimensional deviations are assumed to be 5%, the minimum value of tc/tm is 0.158×0.95/1.05 =0.143.

Meanwhile, the maximum value of tc/tm is 0.158×1.05/0.95=0.174.

Accordingly, by setting the magnet thickness ratio tc/tm to be within a range 0.143≦tc/tm≦0.174, the cogging torque can be further reduced.

In addition, in order that the permanent magnet motor 1 may get characteristics in which the cogging torque relative value of the permanent magnet motor 1 is about half of the cogging torque relative value of the conventional interior permanent magnet motor, the magnet thickness ratio tc/tm would be set to be within a range 0.12≦tc/tm≦0.2.

(2) Rotor Diameter Ratio Rp/Dr

Next, a characteristic diagram illustrated in FIG. 7, in which a magnetic field analysis of the relationship between an iron-core-rotor diameter ratio Rp/Dr and the cogging torque is illustrated, where the rotor external diameter to the outermost periphery of the rotor 20 is Dr and the arc radius of the rotor to the curved surface of each rotor magnetic-pole portion 24 is Rp, will be described.

Figure 7:
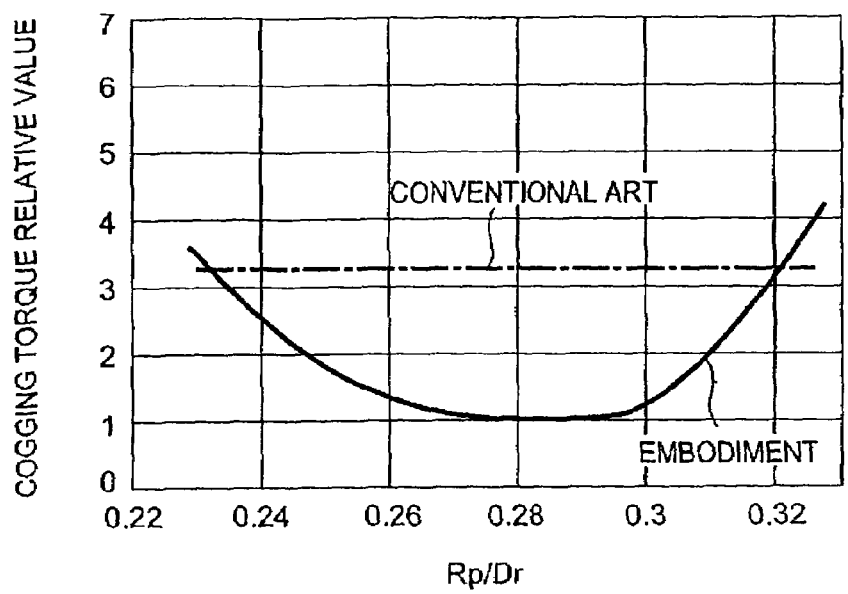
FIG. 7 is a characteristic diagram in which a magnetic field analysis of the relation between Rp/Dr and cogging torque is illustrated, where the maximum diameter of the rotor is Dr and the arc radius of the rotor is Rp.

In FIG. 7, the cogging torque of the permanent magnet motor 1 is minimum where the rotor diameter ratio Rp/Dr is around 0.29, because the magnetic flux wave form from the N (S) pole to the S (N) pole of the permanent magnets 31 in the rotor magnetic-pole portions 24 approximates an ideal sinusoidal wave therearound.

When the rotor diameter ratio Rp/Dr exceeds 0.29, as the rotor arc radius Rp relatively increases with respect to the diameter Dr of the rotor 20, smoothness of magnetic flux variations in the sections between the permanent magnets, in which the polarity switches from the N (S) pole to the S (N) pole 31, is disturbed, more specifically, moves away from the ideal sinusoidal wave, so that the cogging torque increases. When the iron-core-rotor diameter ratio Rp/Dr is smaller than 0.29, as the rotor arc radius Rp relatively decreases with respect to the rotor maximum diameter Dr, the cogging torque increases.

The cogging torque relative value in the conventional interior magnet rotor would be 3.267, where the rotor diameter ratio Rp/Dr is a constant value 0.272.

Accordingly, in order that the cogging torque in the permanent magnet motor 1 according to the present embodiment may be controlled to be lower than the cogging torque in the conventional interior magnet rotor, the rotor diameter ratio Rp/Dr should be set to be within a range 0.23≦Rp/Dr≦0.32.

In addition, in order that the permanent magnet motor 1 may get characteristics in which the cogging torque relative value of the permanent magnet motor 1 is about half of the cogging torque of the conventional interior permanent magnet motor, the rotor diameter ratio Rp/Dr would be set to be within a range 0.255≦Rp/Dr≦0.303.

As described above, by setting the rotor maximum diameter Dr and the rotor arc radius Rp to be within a range 0.23≦Rp/Dr≦0.32, and by setting the sheath thickness tc of the rotor magnetic-pole portions 24 to be constant, and by setting the magnet thickness tm of the permanent magnets 31 to be 2.5 (mm) and the magnet thickness ratio tc/tm to be within a range 0.125≦tc/tm≦0.190, the torque linearity can be enhanced, and the cogging torque can be reduced, compared to the conventional interior permanent magnet motor.

In addition, by setting the magnet thickness ratio tc/tm to be within a range 0.143≦tc/tm≦0.174, the cogging torque can be further reduced.

Moreover, because the motor is configured so that the number of poles of the rotor 20 is 2n, and the number of salient poles 11t of the stator 10 is 3n, when the rotor 20 is skewed, the cogging torque in the permanent magnet motor 1 can be further reduced.

EMBODIMENT 2

Figure 8:
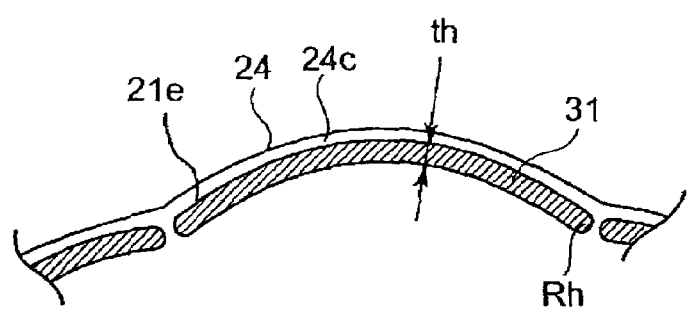
FIG. 8 is an enlarged partial cross-sectional diagram of the outermost portion of the rotor according to another embodiment of the present invention.

Another embodiment of the present invention will be described according to FIG. 8. FIG. 8 is an enlarged partial cross-sectional diagram of the outermost portion of the rotor according to the embodiment of the invention.

There is a maximum rotating velocity as an important characteristic of the permanent magnet motor, other than the cogging torque and the torque linearity. The reason is that, if the maximum rotating velocity is raised, a machine driven by the motor can be operated in high speed, so that productivity can be enhanced.

However, as illustrated in FIG. 8, in the permanent magnet motor in which magnet slots 21e are provided in the rotor 20, and the permanent magnets 31 are inserted into the magnet slots 21e and fixed by adhesive agents or the like, if the maximum rotating velocity is raised, the stress concentrates in the corner portions at both ends of the magnet slots 21e, whereby fixing the permanent magnets 31 can be adversely affected.

Therefore, in order to resolve the problem described above, it is conceivable that curved portions are provided in the approximately arcuate magnet slots 21e for housing the permanent magnets, axially bored in the rotor 20 as illustrated in FIG. 8, so as to reduce stress concentration.

When the length of the magnet slots 21e in the radial direction of the rotor 20 is the slot width th, an approximately semi-circular surface is formed in the corner portions at both ends of each of the magnet slots 21e and the radius of the semi-circular surface is the slot end radius Rh, the magnet slots are configured so that the slot width th equals 2.6 (mm), the slot end radius Rh equals 1.3 (mm), and the slot ratio Rh/th equals 0.5.

Next, a characteristic diagram illustrated in FIG. 9, in which the slot ratio, Rh/th, and the stress relative values at the corner portions at both ends of each of the magnet slots 21e are analyzed, will be described.

Figure 9:
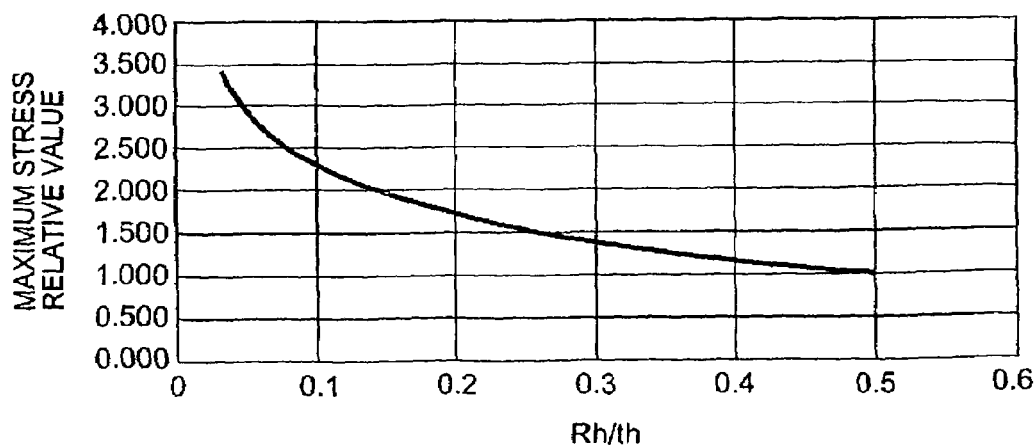
FIG. 9 is a characteristic diagram in which the slot ratio Rh/th, where the slot width of magnet slots is th, and the slot curvature radius of the magnet slots is Rh, and the stress relative values for the corner portion at each end of the magnet slots are analyzed.

As can be seen from FIG. 9, where the slot ratio Rh/th equals 0.5, the stress relative value at the corner portions at both ends of the magnet slots 21e is minimum, and, where $0.4 \leq Rh/th$, the stress relative values at the corner portions at both ends of the magnet slots 21e are between 1.0 and 1.2, which does not cause any problem inpractical use.

As described above, given that the width is th and the slot end radius is Rh, by setting Rh/th to be within a range $0.4 \leq Rh/th$, stress concentration in the corner portions at both ends of the magnet slots 21e caused by a centrifugal force due to the rotation of the rotor 20 can be reduced.

INDUSTRIAL APPLICABILITY

As described above, the permanent magnet motor relevant to the present invention is suitable for a synchronous motor, for instance.

What is claimed is:

1. A permanent magnet motor comprising:
   a stator having a stator coil; and
   a rotor, having a plurality of axially bored magnet slots, provided in an amount for the number of poles in the rotor iron core, permanent magnets being fixed into the magnet slots so that neighboring magnetic poles are opposites; wherein
   in the rotor, the outer peripheral shape of rotor magnetic-pole portions, formed along each magnetic-pole face on the outer peripheral side of the permanent magnets, is formed so that, in a circumferentially central portion thereof, the distance from the center of the rotor iron core is longest, and, at the inter-polar space between a first of the permanent magnets and a second of the permanent magnets, the distance from the center of the rotor iron core is shortest, and so that the outermost surface of rotor magnetic-pole portions forms an arc, the radially outer side of each magnet slot substantially matching the arc, and being bored in an approximate bow shape; and
   given that sheath thickness tc formed by the outer-side surface of each permanent magnet and the outermost surface of each rotor magnetic-pole portion is substantially constant, and letting the thickness of each of the permanent magnets as a whole formed in an approximate bow shape be the magnet thickness tm, then the relation $tc/tm \leq 0.25$ is satisfied.

2. A permanent magnet motor according to claim 1, wherein, given that the diameter where the outer-side surface of the rotor is furthest from the center of the rotor iron core is the rotor maximum diameter Dr, and the radius of each arc formed by the outer-side surface of each of the rotor magnetic-pole portions is the rotor arc radius Rp, then the permanent magnet motor satisfies the relation $0.23 \leq Rp/Dr \leq 0.32$.

3. A permanent magnet motor according to claim 1, wherein, given that the width of each of the magnet slots, corresponding to the thickness of each of the permanent magnets, is the slot width th, and with both ends of each of the magnet slots being provided with a substantially semi-circular surface, the radius of the semi-circular surface is the slot-end radius Rh, then the permanent magnet motor satisfies the relation $0.45 \leq Rh/th \leq 0.5$.

4. A permanent magnet motor according to claim 1, wherein the number of poles in the rotor is 2n, and the number of salient poles in the stator is 3n, where n is a positive integer larger than zero.

5. A permanent magnet motor comprising a stator having a stator coil; and
   a rotor, having a plurality of axially bored magnet slots, provided in an amount for the number of poles in the rotor iron core, permanent magnets being fixed into the magnet slots so that neighboring magnetic poles are opposites; wherein
   in the rotor, the outer peripheral shape of rotor magnetic-pole portions, formed along each magnetic-pole face on the outer peripheral side of the permanent magnets, is formed so that, in a circumferentially central portion thereof, the distance from the center of the rotor iron core is longest, and, at the inter-polar space between a first of the permanent magnets and a second of the permanent magnets, the distance from the center of the rotor iron core is shortest, and so that the outermost surface of rotor magnetic-pole portions forms an arc, the radially outer side of each magnet slot substantially matching the arc, and being bored in an approximate bow shape; and
   given that sheath thickness tc formed by the outer-side surface of each permanent magnet and the outermost surface of each rotor magnetic-pole portion is substantially constant, and letting the thickness of each of the permanent magnets as a whole formed in an approximate bow shape be the magnet thickness tm, then the relation $0.143 \leq tc/tm \leq 0.174$ is satisfied.

* * * * *